United States Patent [19]

Hausslein

[11] Patent Number: 4,623,896
[45] Date of Patent: Nov. 18, 1986

[54] PROPORTIONAL DENSITY RECORDING MEDIUM

[75] Inventor: Robert W. Hausslein, Lexington, Mass.

[73] Assignee: Polaroid Corporation, Cambridge, Mass.

[21] Appl. No.: 698,096

[22] Filed: Feb. 4, 1985

[51] Int. Cl.⁴ .................... G01D 15/34; G03C 5/24
[52] U.S. Cl. .............................. 346/1.1; 346/135.1
[58] Field of Search ..................... 346/1.1, 135.1; 430/293, 348, 363, 945, 495

[56] References Cited

U.S. PATENT DOCUMENTS

| | | | |
|---|---|---|---|
| 3,723,121 | 3/1973 | Hauser | 430/20 |
| 3,745,009 | 7/1973 | Jenkins et al. | 430/522 |
| 3,832,212 | 8/1974 | Jenkins et al. | 430/495 |
| 4,335,198 | 6/1982 | Hanada et al. | 430/348 X |
| 4,380,629 | 4/1983 | Yamashita et al. | 542/455 |
| 4,392,141 | 7/1983 | Inoue et al. | 346/1.1 |
| 4,465,767 | 8/1984 | Oba et al. | 430/271 X |
| 4,504,548 | 3/1985 | Esho et al. | 428/426 X |
| 4,529,688 | 7/1985 | Law et al. | 430/494 X |

Primary Examiner—E. A. Goldberg
Assistant Examiner—Gerald E. Preston

[57] ABSTRACT

A thermal imaging system is provided which includes a heat-sensitive element comprising at least one imaging layer having a selected depth dimension and having therein one or more spectrally absorbing organic materials responsive to the radiation employed for imagewise exposure. The percentage concentration of the organic material increases with depth in a predetermined manner so as to provide uniform heating depthwise within the imaging layer.

39 Claims, 6 Drawing Figures

PROPORTIONAL DENSITY RECORDING MEDIUM

BACKGROUND OF THE INVENTION

The present invention relates generally to imaging systems. More particularly, it concerns thermal imaging methods and structures by which an image is formed using thermal energy.

Various types of imaging systems are known for forming a permanent image on an image carrier, the classic photochemical imaging system relying on photosensitive chemicals, such as silver halides, in granular form that capture incident photons to form catalytic sites on each exposed grain. During subsequent chemical processing, the exposed grains are reduced to their metallic form with a commensurate change in spectral absorption to define an image. In another type of imaging system, termed herein as a heat or thermally responsive system, the incident radiation on an imaging layer is utilized to effect a visible change by converting a portion of the incident radiation into thermal energy which affects one or more color-changing compounds or color-forming reactants to cause a visible color change or reaction, that is, a visible change in color or spectral absorptivity including a change from colorless to colored, from one color to another color, and from color to colorless. In addition to the reactants that participate in the color-forming reaction or other changes that alter spectral absorption, the imaging element can include absorber materials that absorb strongly at a selected wavelength, e.g., an infrared absorber, to promote the conversion of the incident radiation into thermal energy. As incident radiation passes into the imaging layer, the absorption of the radiant energy and its conversion into thermal energy falls off exponentially until the radiation, depending upon the depth of the imaging layer, is virtually fully absorbed, viz., extinguished. Accordingly, the temperature rise in the imaging layer is greatest on the side of the layer facing the radiation source and least on the opposite side. The incident radiation can take the form typical of a conventional photographic exposure, that is, as presented through imaging optics, or an exposure on a pixel-by-pixel basis, e.g., where a laser or other source illuminates, in a successive manner, selected spot-like picture elements on the imaging layer until the entire image is exposed.

The thermally responsive imaging elements have included the transfer type in which first and second reactants are provided in separate donor and receptor layers with the imagewise application of heat energy causing the reactants in the donor layer to inter-react with those of the receptor layer to provide the desired visible change. In addition to providing the reactants in separate donor and receptor layers, the donor materials can be provided in the respective donor layers that are isolated by an intermediate receptor layer. Upon thermal exposure, the donor materials transfer to the intermediate receptor layer to participate in the color-forming reaction. Also, the various materials may be contained in capsules which are ruptured upon exposure to thermal energy to cause the desired change in spectral absorptivity.

Known thermal imaging systems which employ first and second color-forming reactants or a single, independent color-changing compound as the color-imaging materials are disclosed in U.S. Pat. No. 4,392,141. Other color-changing compounds which undergo a visible change in color by the formation of color, the bleaching of color or by a color change in response to thermal energy are disclosed in U.S. Pat. Nos. 3,723,121, 3,745,009, 3,832,212, 4,380,629 and in copending and commonly assigned U.S. patent application Ser. No. 646,771, filed Sept. 4, 1984 by A. L. Borror et al.

There are a number of competing design considerations applicable when designing an imaging element of the type having a single thermally responsive imaging layer coated on or otherwise applied to a supporting substrate or carrier layer. Generally, the thickness of the imaging layer should be thick enough so that the incident radiation, as it penetrates into and is attenuated in the layer, is fully absorbed and converted to heat energy. Also, it is desirable for the incident radiation to develop no more thermal energy within an irradiated area in the imaging layer than necessary to promote the desired color-imaging reaction. Any energy in the irradiated area in excess of that required for the color-imaging reaction is wasteful, and the excess energy can be conducted to an adjacent area to cause, depending upon the energy transferred, color-changes in areas that are not directly irradiated. Where a multilayer imaging element is used, excess heat energy developed in one layer can also be conducted to an adjacent layer to also induce an undesired color-imaging reaction. In order to minimize undesired thermal conductivity effects, the time duration of the exposure radiation is preferably kept relatively short so that the desired energy is introduced into the imaging layer in a time frame that is less than the associated physical heat transfer times in order to minimize heat transfer from the irradiated to non-irradiated areas. Relatively short exposure intervals that introduce the desired quanta of energy can be achieved by increasing the radiant intensity of the exposure radiation. However, increased irradiance beyond certain upper limits can cause local overheating and overtemperature problems in the imaging layer on the side facing the radiation source, these problems include the formation of gasses and degradation of any polymers in the layer.

SUMMARY OF THE INVENTION

In view of the above, the present invention provides for a thermal imaging system particularly, a thermal color imaging system which includes an imaging element defined by a radiation receiving imaging layer of selected depth carried on a supporting substrate or carrier. One or more spectrally absorbing compounds including an infrared radiation absorber or a color-imaging material, with or without a cooperating infrared radiation absorber, are provided in the imaging layer. The spectrally absorbing materials are distributed in the imaging layer so that the percentage concentration increases with the depth of the layer in inverse proportion to the decrease in irradiance and absorption of the exposure radiation. Accordingly, the concentration of the radiation absorbing materials, which can include the color-imaging materials, i.e., the color-forming reactants or color-changing compounds and also the infrared radiation absorbers, is least on the side of the imaging layer that faces the radiation source where an irradiance is highest, and the concentration of the absorbing materials is greatest on the side of the imaging layer opposite the radiation source where the irradiance is least. As a result, the thermal gradient is uniform with the depth of the imaging layer to provide the desired color-imaging reaction through the entire depth of the irradiated layer without local overheating and overtemperature effects.

In one form of the imaging element, at least one color-imaging material having spectral absorptivity characteristics that coincide with the wavelength of the exposure radiation is provided in an imaging layer of predetermined depth with the percentage concentration of the color-imaging material increasing with the depth of the layer in a manner inverse to the reduction in the irradiance of the incident radiation as the radiation penetrates the imaging layer. In another form of the invention, a material having a strong spectral absorptivity at selected wavelengths, such as an infrared absorber, is provided in the imaging layer in combination with the color-imaging material or materials with the precentage concentration of the absorber varying with the depth of the imaging layer to likewise provide uniform depthwise heating in the imaging layer.

In addition to providing uniform depthwise heating in the imaging layer without local overheating, the present invention advantageously permits the exposure interval to be substantially shorter when exposing an imaging layer on a pixel-by-pixel basis using a laser or laser diode as the radiation source. Such short exposure intervals contribute to efficient energy utilization and a decrease in the total image exposure time when forming an exposure on a pixel-by-pixel basis.

An imaging layer in accordance with the present invention can be fabricated by forming successive sub-layers on a supporting substrate with the percentage concentration of the absorbing materials varying in each successive layer to provide a stepwise concentration gradient. By increasing the number of sub-layers, the concentration gradient can approach a smooth curve. In addition, an imaging layer can be fabricated from two sub-layers, one of which has little or none of the absorbing materials and the other of which contains the bulk of the absorbing materials. The two sub-layers are maintained in an adjoining relationship under conditions, e.g., in their wet state, that allow diffusion to take place from one to the other of the sub-layers to thus establish a concentration gradient.

The present invention can be used in a single layer imaging element or in a multi-layer, multi-color imaging element. For example, initially colorless color-imaging materials that form cyan, magenta, and yellow upon exposure can be provided in respective superposed layers. Wavelength selective absorbing compounds that are strongly absorbing at first, second, and third wavelengths within the infrared region of the electromagnetic spectrum can be provided in the respective cyan, magenta, and yellow imaging layers with the percentage concentration of the infrared absorbers varied in the manner described. The imaging layers are exposed to provide a full color image by directing infrared radiation on an imagewise basis into the imaging layers at the first, second, and third wavelengths to cause the desired color-imaging reaction in the respective cyan, magenta, and yellow layers to provide the desired visible color image. Rather than using initially colorless materials, initially colored cyan, magenta and yellow color-imaging materials may be used with the respective infrared absorbing compounds, which upon imagewise exposure at the first, second and third wavelengths of infrared radiation, undergo "bleaching", i.e., decolorization to provide the desired color image, or the initially colored color-imaging materials may be used without the infrared absorbers and the imaging layers exposed with radiation at the selective wavelengths absorbed by the respective colored materials.

In addition to providing wavelength selective colored color-imaging materials and/or infrared absorbers in separate imaging layers and wavelength-specific addressing of the individual layers, an irradiating beam having a variable depth of focus can be used to address the individual layers by varying the depth of focus of the irradiating beam to coincide with the desired imaging layer.

A principal objective of the present invention is, therefore, the provision of an improved thermal imaging system by which uniform energy distribution in the color imaging layer is achieved. Other objects and further scope of applicability of the present invention will become apparent from the detailed description to follow, taken in conjunction with the accompanying drawings, in which like parts are designated by like reference characters.

DESCRIPTION OF THE PREFERRED EMBODIMENT

Figure 1:
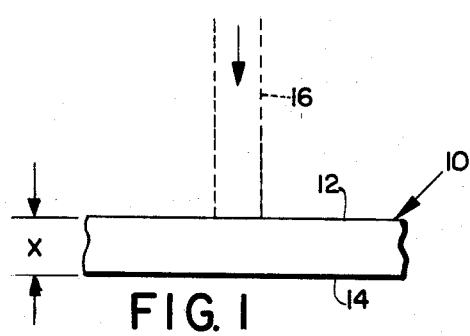
FIG. 1 is a cross sectional representation of an imaging layer and an irradiating beam.

A cross sectional view of a portion of a thermal imaging layer is illustrated in FIG. 1 and designated generally therein by the reference character 10. The imaging layer 10 is shown in schematic form and is normally supported on an underlying carrier or substrate (not shown). The imaging layer 10 has a nominal thickness of depth dimension X, which may be about one to four microns in the case of the preferred embodiment, and is bounded by an entry surface 12, through which incident radiation from a source (not shown) enters the imaging layer, and a rear surface 14.

The imaging layer 10 includes one or more color-imaging materials that undergo a visible change or shift in spectral absorptivity in response to thermal energy, the visible change including a change from colorless to colored, from one color to another color, or from colored to colorless; the change from colored to colorless could also be used to reveal an underlying color layer. In addition to the color-imaging material(s), an absorber material that is strongly absorbing at a predetermined selected wavelengths in the infrared may be included in the imaging layer 10.

Figure 2:
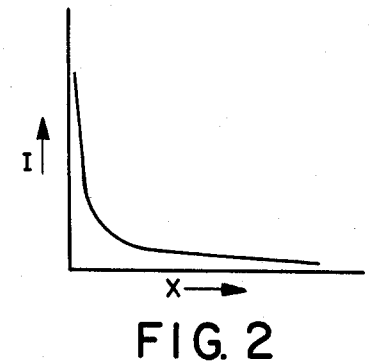
FIG. 2 is an idealized graphical representative of the absorption of incident radiation as it penetrates an imaging layer with the ordinate representing irradiance (normalized) and the abscissa representing penetration depth into the imaging layer (normalized)

In FIG. 1, an exemplary radiation beam 16 is directed into the entry surface 12 of the imaging layer 10 with the beam aligned along the normal. The radiation beam 16 is representative of an imagewise exposure, for example, a pixel-by-pixel exposure and is directed into the imaging layer 10 for a specific exposure interval. As the incident radiation enters the imaging layer 10 through the entry surface 12 a portion is reflected from the surface and the remaining portion transmitted into and absorbed in the imaging layer 10 with the irradiance attenuated with increasing penetration depth. If the depth "X" of the imaging layer 10 is sufficiently thick, virtually all the energy is absorbed and the incident radiation is thus extinguished. As shown in FIG. 2, the attenuation of the irradiance "I" is non-linear and falls off exponentially with penetration depth in accordance with the law of absorption:

$$\text{Ln } I_x/I_o = -ax \qquad \text{EQ. 1}$$

Where "$I_o$" is the irradiance at the entry surface 12 (i.e., $x=0$), "x" is the distance from the entry surface, and "a" is the absorption coefficient. The absorption is greatest at the entry surface 12 and diminished exponentially toward the rear surface 14. Thus, the thermal gradient is similarly non-uniform with depth as the largest amount of thermal energy is developed at or immediately adjacent the entry surface 12 and the least amount of thermal energy developed at the rear surface 14. One consequence of this non-uniform thermal gradient when using high intensity radiant energy is that the thermal energy developed in the imaging layer 10 at and immediately adjacent the entry surface 12 can be in excess of that required for the color-imaging reaction. The excess energy can contribute to surface overheating and the undesired formation of gases as well as physical degradation of polymers and other materials in the imaging layer 10.

Figure 3:
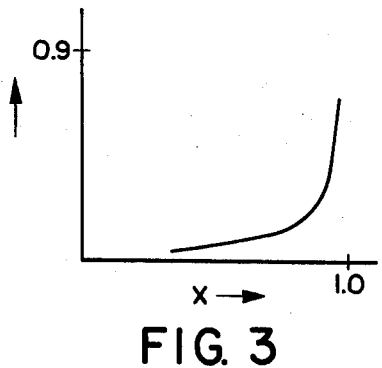
FIG. 3 is an idealized graphical representation, similar to that of FIG. 2, of the variation in concentration with depth of an absorbing material in an imaging layer.
Figure 4:
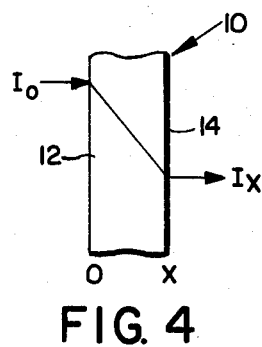
FIG. 4 is an idealized graphical representation of the absorption of incident radiation in an imaging layer having its absorbing materials distributed in accordance with FIG. 3.
Figure 5:
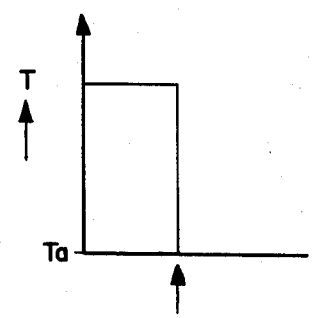
FIG. 5 is an idealized graphical representation of temperature gradient within an exposed imaging layer having spectral absorbing materials therein that vary in concentration with depth in accordance with the function presented in FIG. 3.

In accordance with the present invention, the percentage concentration of those constituents in the imaging layer 10 that absorb the exposure radiation is varied depthwise in a manner inverse to the decrease in absorption with depth to provide uniform depthwise heating in the layer, i.e., a linear thermal gradient. An exemplary distribution curve for the spectrally absorbing materials of the imaging layer 10 is shown in FIG. 3. As shown, the concentration of the spectral absorber or absorbers is least at the entry surface 12 where the irradiance of the exposure radiation is the greatest, and conversely, the concentration is greatest at the rear surface 14 where the irradiance of the exposure radiation is the least. As a consequence of varying the depthwise concentration of the absorber in a manner inverse to the attenuation, the irradiance diminishes in a linear manner, as shown in FIG. 4. As shown in FIG. 5, the isotherm developed in the imaging layer 10 has zero slope, that is, the temperature at the entry surface 12 rises from an ambient temperature to a desired temperature sufficient to cause the color-imaging reaction with the termperature remaining constant with depth in the imaging layer and then returning to the ambient temperature at the rear surface 14 of the imaging layer.

The concentration of the absorber materials can be determined as a function of layer depth from the desired condition that the energy absorbed per unit thickness does not vary with depth, that is:

$$dI/dx = -k \qquad \text{EQ. 2}$$

Integration of EQ. 2 for the boundary conditions at the entry surface of the imaging layer (viz., $I=I_o$ at $x=0$) and substitution in EQ. 1 yields the following relationship between the absorption coefficient "a" as a function of the distance "x" from the entry surface:

$$a = k/(I_o - kx) \qquad \text{EQ. 3}$$

An examplary listing of concentration values for the absorbing materials within the imaging layer is presented below in TABLE 1. The imaging layer is provided with a normalized thickness of $X=1.0$ with the corresponding percentage concentrations presented for imaging layers that absorb 0.50, 0.80, 0.90, and 0.99 of the incident radiation.

The calculation is idealized in that it neglects the concurrent heat conduction laterally and to the adjoining layers, and it neglects the non-uniform cross-section of the real laser beams.

TABLE 1

| | RELATIVE ABSORBER CONCENTRATIONS (%) | | | |
| --- | --- | --- | --- | --- |
| | [fraction absorbed] | | | |
| x | [.5] | [.8] | [.9] | [.99] |
| 0.0 | 0.50 | 0.80 | 0.90 | 0.99 |
| 0.2 | 0.56 | 0.95 | 1.02 | 1.23 |
| 0.4 | 0.63 | 1.18 | 1.41 | 1.64 |
| 0.6 | 0.71 | 1.54 | 1.96 | 2.44 |
| 0.8 | 0.83 | 2.22 | 3.21 | 4.76 |
| 0.9 | 0.91 | 2.86 | 4.73 | 9.08 |
| 1.0 | 1.00 | 4.00 | 9.00 | 99.00 |

The preferred thermo-chromic color-imaging materials are organic compounds of the type disclosed in aforementioned U.S. patent application Ser. No. 646,711 which initially absorb radiation in the visible or non-visible region of the electromagnetic spectrum and which, upon heating, are capable of undergoing an irreversible unimolecular fragmentation of at least one unstable carbamate moiety whereby the absorption of the compound is visibly changed from colorless to colored, from a color to colorless or from one color to another color. When a particular thermo-chromic material does not absorb well at the exposure radiation wavelength, i.e., is essentially tranparent to the wavelength of the exposure radiation, absorber materials that are strongly absorbing to the exposure radiation are provided with the thermo-chromic material. Using exposure radiation in the infrared, an inorganic infrared absorber may be utilized, although the preferred absorbers are organic compounds, such as a cyanine, merocyanine, squarylium or thiopyrylium dye. The particular infrared absorber is preferably non-absorbing in the visible region of the electromagnetic spectrum so as not to affect the desired color-imaging reaction.

A layer of thermo-chromic material can include a binder that cooperates with a common solvent to aid in forming an imaging layer on a support substrate or carrier. Suitable binders include polyvinyl alcohol, polyvinyl pyrrolidone, methyl cellulose, cellulose acetate butyrate, copolymers of styrene and butadiene, polymethyl methacrylate, copolymers of methyl and ethyl acrylate, polyvinyl acetate, polyvinyl butyral, polycarbonate, and polyvinyl chloride.

The supporting substrate or carrier upon which the imaging layer is formed may be any material that retains its dimensional stability at the temperature used for image formation. Such materials include natural or synthetic paper with or without a coating of a resin or pigment, such as calcium carbonate or calcined clay, and plastic films such as polyethylene, polypropylene, polycarbonate, cellulose acetate, polyethylene terephtalate, and polystyrene.

An imaging layer having the desired distribution of the absorbing materials may be formed by depositing successive sub-layers onto a substrate with the sub-layer first deposited having the highest concentration of absorber material and the successively applied sub-layers having a lower concentration of the absorbing materials. As the number of sub-layers increases, the distribution of absorbing materials can approach a continuous curve. In addition, an image layer can be formed by providing two sub-layers, one of which has a high concentration of the absorbing mterials and the others of which has no or a low concentration of the absorbing materials. The layers are maintained relative to one other in a wet condition that fosters diffusion from the former sub-layer into the latter sub-layer with the process halted when the desired concentration distribution has been obtained.

Figure 6:
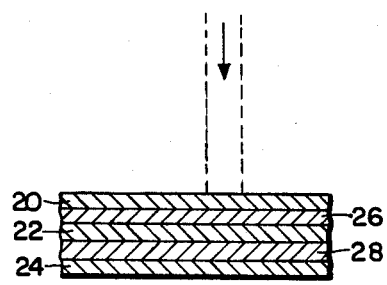
FIG. 6 is a cross sectional representation of a three-layer subtractive imaging system incorporating the present invention.

A preferred imaging element is shown in cross section in FIG. 6 and includes first, second, and third imaging layers 20, 22, and 24 separated by interlayers 26 and 28 that assist in thermally isolating the imaging layers. Each of the imaging layers 20, 22, 24 has a preferred depth dimension of about 1–4 microns with each of the interlayers 26 and 28 having a preferred depth dimension of about 2–3 microns. The imaging layers 20, 22 and 24 are provided with yellow, magenta, and cyan color-imaging materials and infrared absorbers that are strongly absorbing at first, second, and third wavelengths in the infrared region of the electromagnetic spectrum, e.g., 760, 820, and 880 nm, with the infrared absorbers distributed depthwise in the manner described above. Each of the imaging layers 20, 22, and 24 can be individually addressed by irradiation from a laser having an output corresponding to the absorbing wavelengths of the infrared absorber in the particular layer to be addressed. Thus, the cyan layer 24 can be addressed at 880 nm independently of the magenta and yellow layers, 22 and 20; the magenta layer 22 can be addressed at 820 nm independently of the cyan and yellow layers, 24 and 20; and the yellow layer 20 can be addressed at 760 nm independently of the magenta and cyan layers, 22 and 24. The interlayers 26 and 28 function to limit heat transfer between the imaging layers 20, 22, and 24 to assist in accurate subtractive color-formation. Because different heat transfer boundary conditions may be present between the imaging layers and the contiguous interlayer, between the top-most image layer and the ambient atmosphere, and between the bottom-most layer and the support substrate, it may be desirable to vary the distribution of the absorber concentration in an imaging layer immediately adjacent its boundary in a compensating manner. For example, where the boundary heat transfer conditions are such that heat is transferred out of the imaging layer, it may be desirable to locally increase the absorber concentration, and, where the heat transfer boundary conditions are of such that heat is not transferred out, it may be desirable to locally reduce the concentration of the absorbing materials.

Though the thermal imaging system of the present invention has been described in terms of the preferred embodiment of employing color-imaging materials, with or without a cooperating radiation absorber material, it will be understood that the subject invention of providing uniform depthwise heating of the imaging layer also finds utility in thermal imaging applications that do not necessarily require a color change. For example, the imaging layer may contain only the radiation absorber material and upon imagewise exposure to infrared radiation of the appropriate wavelength, a detectable change, i.e., an irreversible visible change in reflection and/or transmission of the imaging layer may be obtained by the imagewise formation of depressions or "pits". Such optical recording systems employing heat-sensitive elements for laser read/write and other data storage applications are now well known, and in addition to the imaging layer, the heat-sensitive element may include, for example, a reflective or other layer between the carrier or substrate and the imaging layer as described in U.S. Pat. Nos. 3,787,873 and 4,230,939.

Thus, it will be appreciated from the above that as a result of the present invention a highly effective thermal imaging system is provided by which the principal objective, among others, is completely fulfilled. As noted above, it will be equally apparent and is contemplated that modification and/or changes may be made in the illustrated embodiment without departure from the scope of the present invention. Accordingly, it is expressly intended that all mater contained in the foregoing description or shown in the accompanying drawings shall be interpreted as illustrative and not in a limiting sense.

What is claimed is:

1. A method of thermal imaging comprising the step of:
    irradiating imagewise an imaging layer having a selected depth dimension and having therein an organic material that has an initial spectral absorptivity in the visible or non-visible region of the electromagnetic spectrum, the concentration of said material varying as a function of depth from a radiation entry surface of the layer, the irradiation within the initial absorption spectra of the material developing heat energy therein to cause an imagewise visible change in said imaging layer.

2. The method of claim 1, wherein said imaging layer is carried on a supporting substrate.

3. The method of claim 1, wherein said imaging layer has a depth dimension of between about 1 and 4 microns.

4. The method of claim 1, wherein the concentration of the material increases with depth from the entry surface.

5. The method of claim 4, wherein the concentration of the material increases exponentially with depth from the entry surface.

6. The method of claim 4, wherein the concentration of the material increases with depth from an entry surface to provide a substantially uniform temperature gradient with depth from the entry surface.

7. The method of claim 4, wherein the concentration of the material increases with depth from an entry surface as a function of:

$$a = k/(I_o - k_x)$$

where "a" is the absorption at a point in the imaging layer, "k" is a constant, "$I_o$" is the initial irradiance, and "x" is the distance from the point from the entry surface.

8. The method of claim 1, wherein said imagewise visible change is an irreversible color change in spectral absorption of said organic material from colorless to colored, from a first color to a second color, or from a color to colorless.

9. The method of claim 1, wherein the irradiation is provided by a laser having an output within the initial absorption spectra of the material.

10. A method of thermal imaging comprising the step of:
irradiating imagewise an imaging element having at least first and second imaging layers, the layers having selected depth dimensions and each having therein an organic material that has an initial spectral absorptivity in respective first and second portions of the visible or non-visible regions of the electromagnetic spectrum and which undergo irreversible visible change to respective first and second spectral absorptivities in response to heat, the concentration of the material in each layer varying as a function of the depth from a respective radiation entry surface of each layer.

11. The method of claim 10, wherein said imaging layers are carried on a supporting substrate.

12. The method of claim 10, wherein said imaging layers each have a depth dimension of between about 1 and 4 microns.

13. The method of claim 10, wherein the concentration of the material in each layer increases with depth from the entry surface.

14. The method of claim 13, wherein the concentration of the material in each layer increases exponentially with the depth from the entry surface.

15. The method of claim 13, wherein the concentration of the material in each layer increases with depth from an entry surface to provide a substantially uniform temperature gradient with depth from the entry surface.

16. The method of claim 13, wherein the concentration of the material increases with depth from an entry surface as a function of:

$$a = k/(I_o - k_x)$$

where "a" is the absorption at a point in the imaging layer, "k" is a constant, "$I_o$" is the initial irradiance, and "x" is the distance fom the point from the entry surface.

17. The method of claim 10, wherein the irreversible visible change in spectral absorption is one of a change from colorless to colored, from a first color to a second color, from a color to colorless.

18. The method of claim 10, wherein the irradiation is provided by a laser having an output within the initial absorption spectra of the material in each layer.

19. A method of thermal imaging comprising the step of:
irradiating imagewise an imaging layer having a selected depth dimension and having therein a color-changing material that undergoes an irreversible visible change in spectral absorption in response to heat and an infrared absorber material, the concentration of said absorber material varying as a function of depth from a radiation entry surface of the layer, the irradiation within the absorption spectra of the absorber material developing heat energy therein to cause the irreversible visible change in spectral absorption of the color-changing material.

20. The method of claim 19, wherein said imaging layer is carried on a supporting substrate.

21. The method of claim 19, wherein said imaging layer has a depth dimension of between about 1 and 4 microns.

22. The method of claim 19, wherein the concentration of the material increases with depth from the entry surface.

23. The method of claim 22, wherein the concentration of the material increases exponentially with depth from the entry surface.

24. The method of claim 22, wherein the concentration of the material increases with depth from an entry surface to provide a substantially uniform temperature gradient with depth from the entry surface.

25. The method of claim 22, wherein the concentration of the material increases with depth from an entry surface as a function of:

$$a - k/(I_o - k_x)$$

where "a" is the absorption at a point in the imaging layer, "k" is a constant, "$I_o$" is the initial irradiance, and "x" is the distance from the point from the entry surface.

26. The method of claim 19, wherein the irreversible visible change in spectral absorption is one of a change from colorless to colored, from a first color to a second color, from a color to colorless.

27. The method of claim 19, wherein the irradiation is provided by a laser having an output within the initial absorption spectra of the absorber material.

28. A heat sensitive element comprising:
a layer having a selected depth dimension supported on a substrate, the layer having therein an organic material that has an initial spectral absorptivity in the visible or non-visible region of the electromagnetic spectrum, the concentration of said material varying as a function of depth from a radiation entry surface.

29. The element of claim 28, wherein said imaging layer has a depth dimension of between about 1 and 4 microns.

30. The element of claim 28, wherein the concentration of the material increases with depth from the entry surface.

31. The element of claim 28, wherein the concentration of the material increases exponentially with depth from the entry surface.

32. The element of claim 28, wherein the concentration of the material increases with depth from an entry surface to provide a substantially uniform temperature gradient with depth from the entry surface when irradiated with radiation within the initial absorption spectrum of the material.

33. The element of claim 28, wherein the concentration of the material increases with depth from an entry surface as a function of:

$$a - k/(I_o - k_x)$$

where "a" is the absorption at a point in the imaging layer, "k" is a constant, "$I_o$" is the initial irradiance, and "x" is the distance from the point from the entry surface.

34. A heat sensitive element comprising:
a layer having a selected depth dimension supported on a substrate, the layer having therein a color-changing material that undergoes an irreversible visible change in spectral absorption in response to heat and an infrared absorber material, the concentration of the absorber material varying as a function of depth from a radiation entry surface of the layer.

35. The element of claim 34, wherein said imaging layer has a depth dimension of between about 1 and 4 microns.

36. The element of claim 34, wherein the concentration of the absorber material increases with depth from the entry surface.

37. The element of claim 34, wherein the concentration of the absorber material increases exponentially with depth from the entry surface.

38. The element of claim 34, wherein the concentration of the absorber material increases with depth from an entry surface to provide a substantially uniform temperature gradient with depth from the entry surface when irradiated with the initial absorption spectrum of the absorber material.

39. The element of claim 34, wherein the concentration of the abosrber material increases with depth from an entry surface as a function of:

$$a-k/(I_o-k_x)$$

where "a" is the absorption at a point in the imaging layer, "k" is the constant, "$i_o$" is the initial irradiance, and "x" is the distance from the point from the entry surface.

* * * * *